Feb. 26, 1957 R. HOPKINS 2,782,868
FILTER
Filed June 1, 1954

Royce Hopkins
INVENTOR.

BY
Browning Simmons + Hyer
ATTORNEYS

United States Patent Office 2,782,868
Patented Feb. 26, 1957

2,782,868

FILTER

Royce Hopkins, Houston, Tex.

Application June 1, 1954, Serial No. 433,550

1 Claim. (Cl. 183—61)

This invention relates to a filter and more particularly to a filter for removing foreign matter from a stream of fluid used to operate a fluid motor or the like where particles of very small size must be removed from the flow stream.

Valves controlling flow lines such as oil and gas pipelines are frequently opened and closed by valve operators. These operators frequently employ as prime movers fluid motors in which clearance between moving parts in the motor is quite small. Fluid to operate such motors is usually drawn from the line being controlled and such fluid is quite frequently contaminated with foreign matter, which if allowed to reach the motor and limit valves of the valve operator present a serious erosion problem. This is particularly true where the line being controlled contains fluid under pressure of from 600 to 900 pounds or more as the fluid motors for valve operators controlling such lines are frequently high pressure turbines in which the clearance between the moving parts is as small as 0.0002 inch. Desirably, particles approaching in size the clearance in the turbine should be removed from the flow stream before they reach the turbine and limit valves of the valve operator, but without substantial pressure drop across the filter effecting such removal.

High pressure turbines are also used in emergency service where a supply of high pressure fluid is available. Turbines in such service will be used for a limited length of time to operate a hydraulic pump, generator or the like until the main equipment can be placed in service again. Again it is desirable to protect the turbine from foreign matter.

The filter used in removing such particles should be one which does not easily clog and which may be quickly and easily cleaned at periodic intervals while intact in the supply system between the line being controlled and the operator, and under line pressure.

Strainers heretofore proposed for service with fluid-motor driven valve operators have been either a maze type which will strain foreign matter having a particle size of approximately 0.015 inch or have employed perforated sheet metal which will strain foreign matter having a particle size of approximately 0.031 inch. These strainers not only have not removed the finer particles from the fluid stream but they clog easily and necessitate closing off the line and dismantling the strainer each time it is cleaned.

An object of this invention is to provide a filter capable of removing foreign matter of very small particle size from a fluid stream without appreciable pressure drop across the filter.

Another object is to provide a filter in which the filtered foreign matter is free to drop clear of the filter element to prevent clogging of the element.

Another object is to provide a filter in which filtered foreign matter is free to drop clear of the filter element and into a trap from whence it can be removed while the filter is under line pressure.

Another object is to provide a filter in which means are provided for inducing reverse flow through the filter element to clean out the element while the filter is under line pressure.

Another object is to provide a filter which requires only a single step operation for cleaning out both the trap and the filter element of the filter in which the filter is under line pressure during the operation.

Another object is to provide a filter in which the filter element may be replaced without removing the filter from a flow line.

Another object is to provide a filter in a supply system for the fluid motor of a valve operator in which the larger particles of foreign matter in the fluid stream precipitate out of the stream into a trap before they reach the filter element in the filter, substantially all of the remainder of the foreign matter is filtered out by a filter element, and such filter element is designed to permit the filtered foreign matter to fall free of the filter element whereby the filter element will in effect be self-cleaning and not easily clogged.

Another object is to provide a filter of the type referred to in the next preceding paragraph in which there is provided a means for cleaning out said trap and inducing reverse flow through the filter element while the filter is under line pressure to remove any particles which may have become entrapped in the element.

Other objects, advantages and features of this invention will be apparent to one skilled in the art upon a consideration of the written specification, the appended claim, and the attached drawing.

In the drawing, wherein like reference numerals indicate like parts and wherein there is shown by way of illustration a preferred embodiment of this invention:

Figure 1:
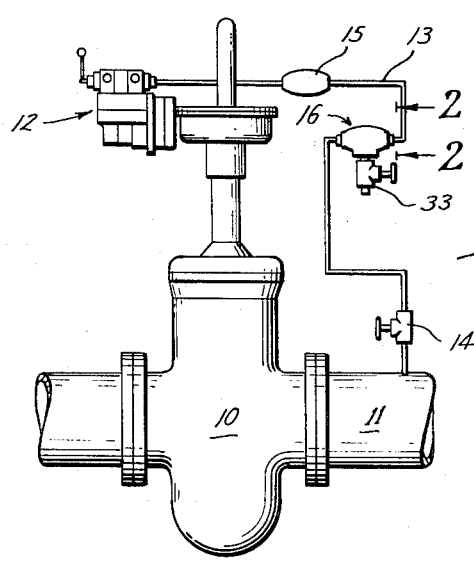
Fig. 1 is a view in elevation of a typical motor operated valve installed in a flow line and including in the fluid supply system for the fluid motor of the valve operator a filter embodying this invention.
Figure 2:
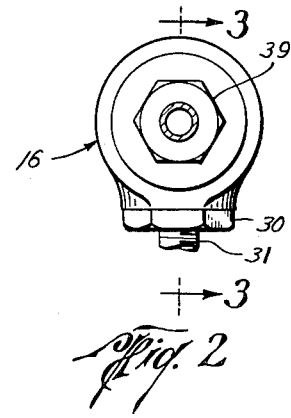
Fig. 2 is a view along the line 2—2 of Fig. 1.
Figure 3:
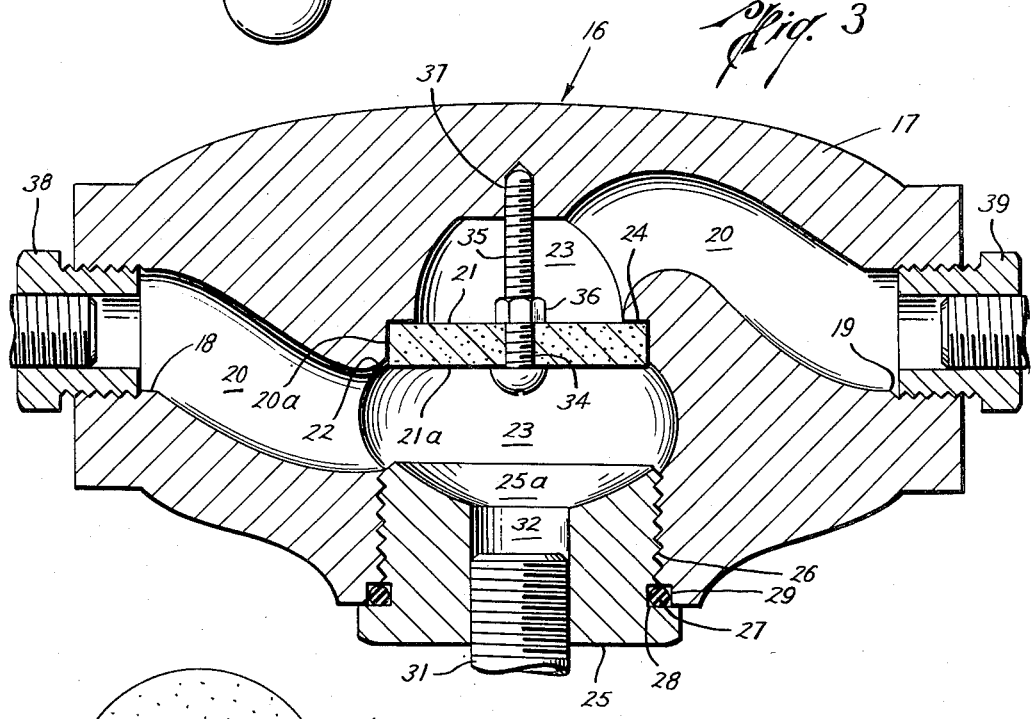
Fig. 3 is a view along the line 3—3 of Fig. 2.
Figure 4:
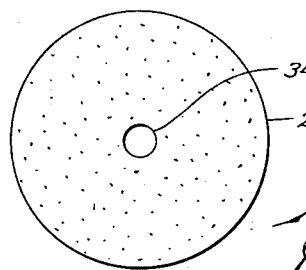
Fig. 4 is an end view of the filter element shown in Fig. 3.

Referring now to the drawing and particularly to Fig. 1, a valve 10 is flanged in pipeline 11. Valve 10 may be of any conventional type capable of controlling lines carrying high pressure such as the gate valve illustrated. The valve is provided with a valve operator indicated generally at 12. The valve operator may be of any desired type which is operated by a fluid motor. Where the fluid for operating such motor is taken from a high pressure source, that is, on the order of 600 to 900 pounds per square inch or more, it is usually preferred that the motor be a high pressure turbine.

A supply system for interconnecting the fluid motor of the valve operator and a source of pressure fluid such as line 11 is provided to supply pressure fluid to the valve operator. The system includes a conduit 13 extending between line 11 and operator 12. Conduit 13 is controlled by a valve 14 positioned closely adjacent line 11 so that pressure may be removed from the supply system and the valve operator for repair or replacement of any part thereof.

Preferably an oiler 15 is positioned in conduit 13 and provides oil to lubricate the fluid motor of valve operator 12. Oiler 15 may be of any conventional type, such as for instance, a reservoir of oil connected to a Venturi through which at least a portion of fluid flowing through conduit 13 is directed. The reduced pressure in the throat of the Venturi causes a small quantity of oil to flow from the reservoir into the Venturi from whence it is carried by the flow stream into the fluid motor of valve operator 12 and provides a lubricant for the moving parts thereof.

A filter indicated generally at 16 constructed in accordance with this invention is positioned in supply conduit 13 to filter foreign matter from the flow stream. The filter is usually positioned upstream of the oiler 15 so that all of the oil introduced into the stream by the oiler will go directly to the fluid motor of valve operator 12 and will not contaminate the filter element of the filter and make it more difficult to clean. Where it is desired to filter from the flow stream a fluid immiscible with the lubricating oil and having a different surface tension from that of the lubricating oil, such as water, the filter may be placed downstream of oiler 15. When the filter is so placed the oil will take possession of the surfaces of the sintered metal-powder filter element preferred for use with the filter of this invention and prevent flow of such immisicible fluid through the filter element.

Filter 16 comprises an oval shaped body 17 capable of containing high pressure. Preferably, the body 17 is cast as an integral unit both to reduce the cost of fabricating the body and eliminate seals which are necessitated by multiple piece bodies. Body 17 is provided with an inlet 18 and an outlet 19 which are interconnected by a passageway 20. The filter 16 is positioned in conduit 13 in such a manner that passageway 20 has a section extending upwardly in the direction of flow through the filter so that fluid will rise through said section and pass upwardly through a filter element 21 positioned across said upwardly extending section. The upwardly extending section permits filter element 21 to be positioned in the passageway 20 in a substantially horizontal plane with its upstream face 21a on the nether side of the filter element. With element 21 so positioned there is no support upon which filtered matter may rest and such matter will fall free from the filter element 21 reducing the tendency of this element to clog. This is particularly true when the filter is used in a supply stream system for a fluid motor which operates only infrequently, as is the case with the fluid motor of a valve operator, as the fluid within the filter will be quiescent between periods of operation of the fluid motor and the fluid will not hold the filtered particles against upstream face 21a of the filter element.

Preferably, the filter 16 is constructed with a turn 22 in passage 20 and the filter 16 is so positioned in conduit 13 that the section 20a of passage 20 which section lies immediately downstream of said turn extends upwardly from the turn to provide said upwardly extending section of the passageway in which filter element 21 is positioned. Preferably, the section of passageway 20 immediately downstream of turn 22 is enlarged to form a flat spherical expansion chamber 23. Expansion chamber 23 is provided with an annular seat 24 which surrounds expansion chamber 23 and against which filter element 21 is seated. The expansion chamber reduces the velocity of fluid rising through filter element 21 and reduces the pressure drop across filter element 21 by reason of both the reduced velocity and the increased diameter of the filter element which, of course, provides more fluid passageways through the element. The reduced velocity permits the larger particles of foreign matter to drop out of the flow stream as it rises in expansion chamber 23, and before they reach filter element 21.

The bottom of expansion chamber 23 forms a trap for collecting foreign matter. The trap is preferably formed by a removable plug 25 threadedly received in a bore 26 which opens into the bottom of expansion chamber 23. Bore 26 is located directly below filter element 21 and has a diameter slightly larger than the diameter of the filter element so that the filter element may be inserted and removed through bore 26. An O-ring 27 is positioned in an annular groove 28 in plug 25. O-ring 27 seats in an annular recess 29 surrounding bore 26 when plug 25 is made up in body 17 and seals between the plug and body. The nose of the plug is provided with a depression which serves to collect foreign matter and remove it from the direct blast of fluid flowing through the filter. Preferably, this depression is formed by sloping the nose surface 25a of the plug inwardly from the outer cylindrical wall of the plug to form a concave depression so that filtered matter will tend to collect in the center of lowermost portion of the trap.

Plug 25 is provided with a wrench receiving part 30 but it is pointed out that the plug may be inserted handtight and O-ring 27 will seal against loss of fluid.

The supply system is preferably provided with a blowdown vent opening into the passage 20 upstream of the filter element 21 to permit venting of the system to atmosphere and thereby induce reverse flow through the filter element 21 to clean the filter element, that is, fluid in conduit 13 downstream of filter element 21 would flow towards the blow-down vent and in so doing pass through filter element 21 and clean substantially all of the entrapped foreign matter out of the element. Where the fluid in the system is a gas, back flow will be permitted by expansion of the gas. Where the fluid is a liquid, elastic means of some kind must be provided to permit back flow. The blow-down vent preferably opens into passage 20 adjacent the trap so that when the blow-down vent is opened it will clean out the trap as well as filter element 21. This arrangement may be provided by threading a nipple 31 into a central bore 32 in plug 25 and controlling flow through nipple 31 by a valve 33 (see Fig. 1). With this arrangement bore 32 and the central passage through nipple 31 provide additional space into which filtered matter may fall and be removed from the flow stream passing through the filter. Blow-down valve 33 may be of any desired type which is easily opened against a large pressure differential across the valve member such as a gate or plug valve.

Filter element 21 is preferably a sintered metal-powder element as such an element will filter foreign matter having very small particle size with but a relatively small pressure drop across the filter. The size of particles of foreign matter removed from the flow stream by the filter element will depend upon the metal used and the size of the particles sintered together to form the element. Filter element 21 may be of any desired shape so long as its upstream face 21a is on the nether side of the element so that the filter element will not support filtered particles on its upstream face and these particles will tend to fall of their own weight into the trap. For further information on sinter filter elements reference is made to an article entitled Metal powder filters appearing in Product Engineering, April 1953.

Filter element 21 is provided with a central bore 34 through which is passed bolt 35. A nut 36 threaded onto bolt 35 holds the filter element 21 against the head of the bolt and insures that filter element 21 will follow bolt 35 as it is removed from threaded bore 37 in housing 17.

Referring to those portions of passageway 20 which lie upstream and downstream of expansion chamber 23, it will be noted that these passageways are streamlined to offer the least resistance to flow and that the inlet of the upstream portion of passageway 20 into expansion chamber 23 is below and substantially at right angles to the upstream face of filter element 21 so as to prevent a direct blast of pressure fluid against filter element 21. Inlet 18 and outlet 19 are provided with reducing bushings 38 and 39, respectively. Thus, reducing bushing 38 and the upstream portion of passageway 20 permit slight expansion of fluid flowing through conduit 13 before it reaches expansion chamber 23 where it further expands and passes through the filter element 21.

When the system is in use, valve 14 will be open. When valve operator 12 is energized either manually at the valve or by remote control, valves controlling flow of fluid into the fluid motor of the valve operator 12 open and fluid from line 11 passes through the supply system into the fluid motor of valve operator 12 to open or close valve 10. When the valve 10 reaches its desired position the valves in valve operator 12 are automatically closed to stop flow of fluid through the supply system. While the fluid motor of the valve operator is running fluid will pass through filter 16. As the fluid rises in the expansion chamber 23 the heavier particles of foreign matter in the flow stream will fall out and collect in the trap provided by plug 25. The remaining particles of foreign matter above a predetermined size will be filtered out by filter element 21 and will in large part be held against the upstream face of the filter element 21 by the velocity of the fluid passing through the filter element. The predetermined size of the particles to be filtered out will, of course, be determined by the material used in forming filter element 21 and by the particle size of such material. After valve 10 has been seated or unseated as the case may be and the valves of motor operator 12 have closed, flow through filter 16 will cease and filtered particles which were held against the upstream face 21a of filter 21 by fluid rising through the filter will now be free to fall from the upstream face under their own weight and collect in the trap provided by plug 25.

At periodic intervals blow-down valve 33 should be opened to clean out the trap by venting passage 20 to atmosphere. This venting will induce reverse flow of fluid downstream of filter element 21 and as such fluid flows in reverse direction through filter element 21 it will clean out any entrapped particles in the filter element. Where the filter element 21 is very dirty, it may be desirable to close shut-off valve 14 before opening vent valve 33 so that all of the pressure fluid downstream of filter element 21 can be utilized as a cleanser.

If after prolonged use filter element 21 becomes clogged or worn sufficient to necessitate replacement, the element may be readily removed by closing shut-off valve 14, venting the supply system by opening valve 33 and removing plug 25 to provide access to the filter element. After the plug 25 has been removed it is only necessary to unscrew bolt 35 to remove the filter element 21.

From the above it will be seen that all of the objects of this invention have been accomplished. There has been provided a filter in which the filter element while filtering particles of very small size through a flow stream will not easily clog.

A means has been provided for cleaning out and removing from the supply system the accumulated foreign matter by the simple expedient of opening a single valve. The opening of this valve also causes a pressure drop across the filter element 21 in the opposite direction to the pressure drop across the filter element during normal flow so that back flow of fluid downstream of the element is induced. Such backflowing of fluid tends to clean out any foreign matter entrapped in the filter 21.

There has also been provided a filter in which the filter element is so positioned in the flow stream that its upstream face will not provide support for filtered foreign matter resulting in such foreign matter dropping free from the filter and reducing the likelihood of clogging of the filter.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claim.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

A filter for cleaning a stream of gas comprising, a one piece oval shaped body having an in line inlet and outlet, a streamline interconnecting passageway between the inlet and outlet, a turn in said passageway, said filter adapted to be positioned in a flow line with the section of the passageway immediately downstream of said turn extending upwardly from the turn, said passageway at the turn increasing in diameter to provide a generally flat spherical shaped expansion chamber with the passageway upstream of the chamber opening into the side wall of the lower section of the chamber, a sintered metal powder filter element extending across the chamber at an intermediate point thereof and above the point where the upstream portion of the passageway enters the chamber, said filter element seated on a downwardly facing shoulder with its upstream side facing downwardly so that filtered matter will tend to gravitate therefrom, a plug having a diameter greater than the diameter of the filter element and releasably secured in a bore opening into the passageway at the turn and below the filter element, said plug having a depression in its nose forming a portion of the spherical chamber and providing a trap in which filtered matter which drops from the upstream face of the filter element may collect, said plug when removed providing access to the filter element for replacement thereof, and venting means for inducing reverse flow of gas downstream of the filter element to clean out the element and the trap.

References Cited in the file of this patent

UNITED STATES PATENTS

| | | |
|---|---|---|
| 136,364 | Conger | Mar. 4, 1873 |
| 217,577 | Bryant | July 15, 1879 |
| 805,237 | Sears | Nov. 21, 1905 |
| 1,160,653 | Rayfield | Nov. 16, 1915 |
| 1,167,246 | Adair | Jan. 4, 1916 |
| 2,368,787 | Skinner | Feb. 6, 1945 |
| 2,454,982 | Wallace | Nov. 30, 1948 |
| 2,565,690 | Ketelsen | Aug. 28, 1951 |
| 2,641,364 | Depallens | June 9, 1953 |